Patented Nov. 27, 1951

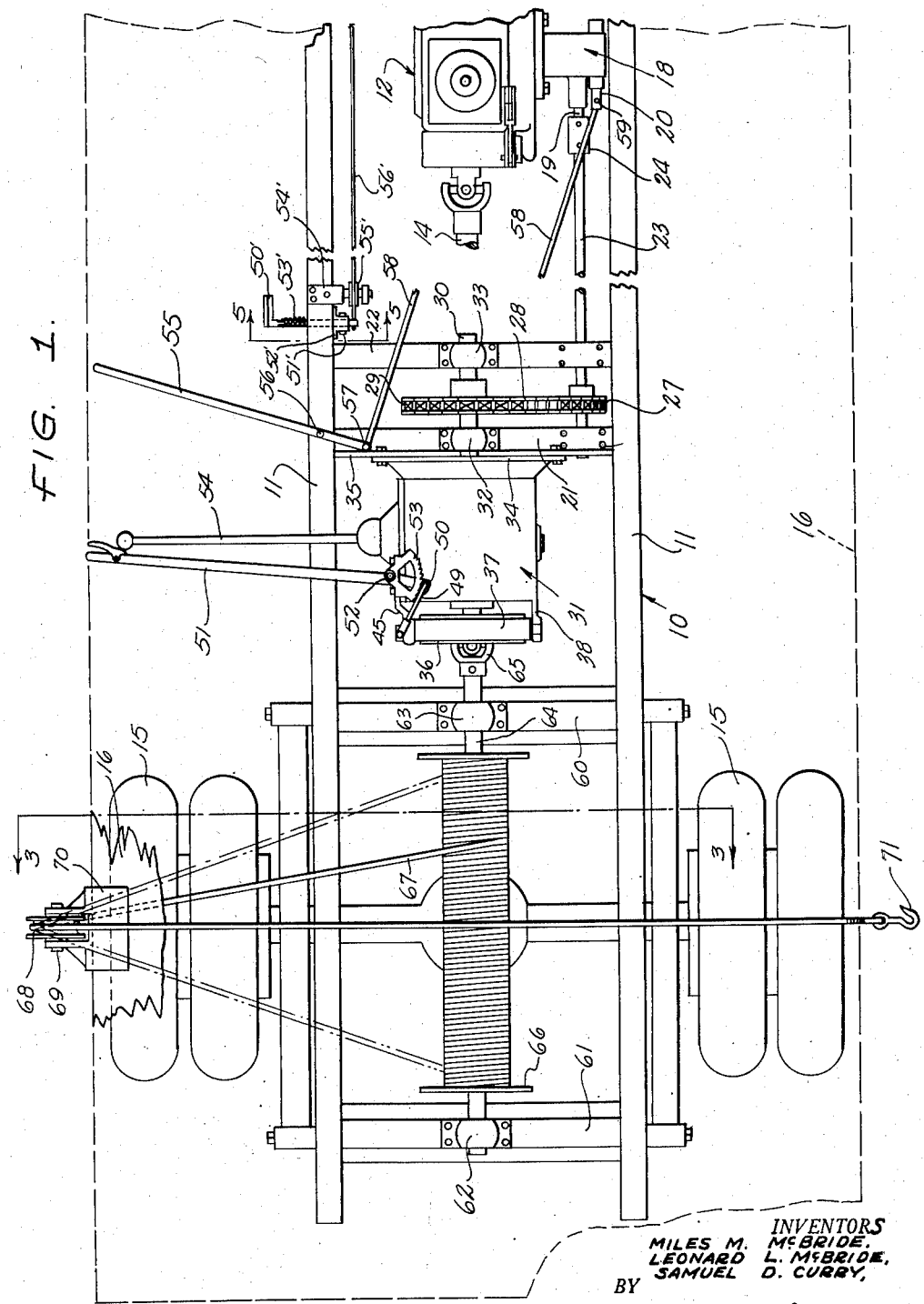

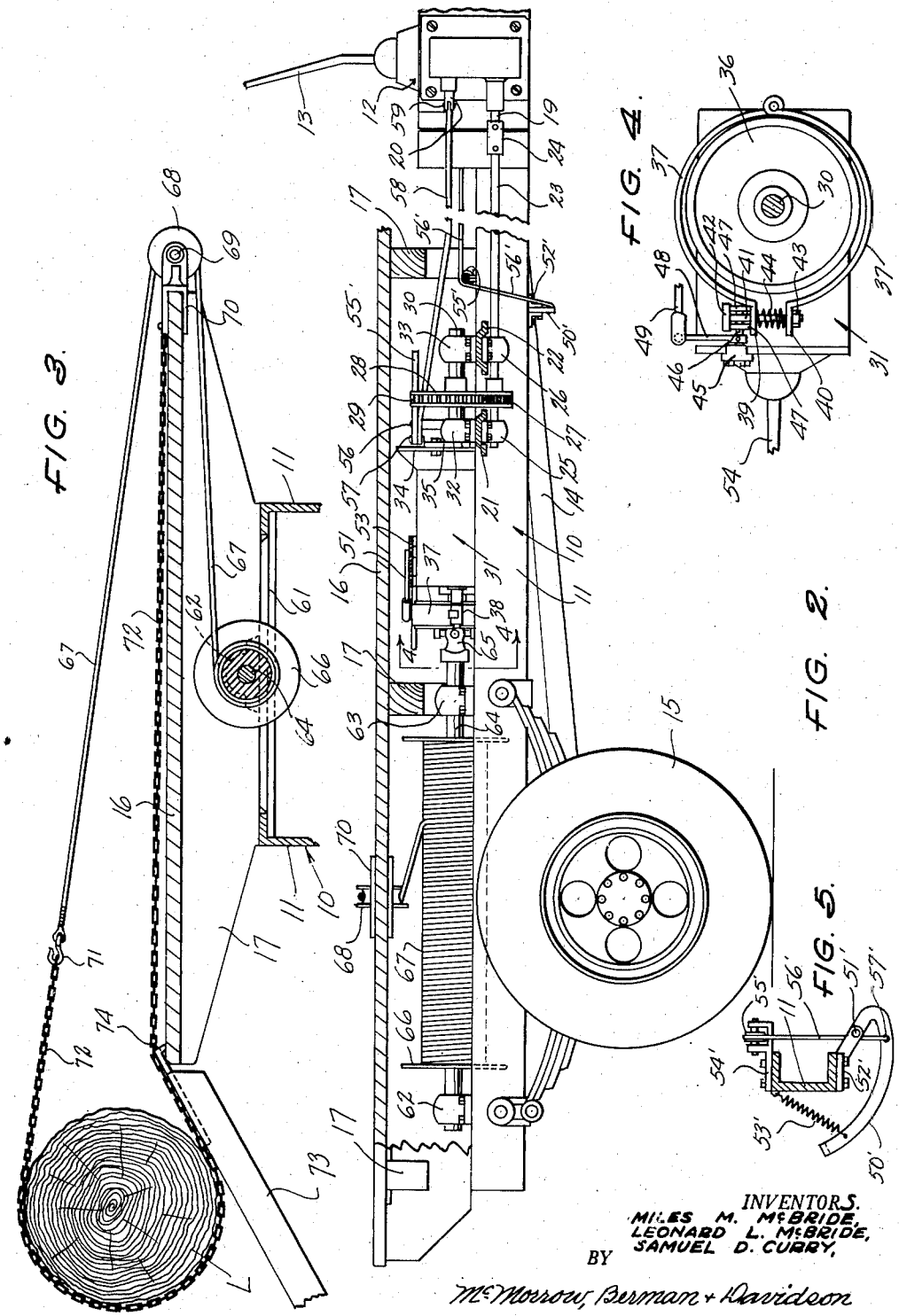

2,576,187

UNITED STATES PATENT OFFICE 2,576,187

LOG-LOADING DEVICE FOR MOTOR VEHICLES

Miles M. McBride and Leonard L. McBride, Kinderhook, and Samuel D. Curry, Oakwood, Ill.

Application June 16, 1950, Serial No. 168,566

2 Claims. (Cl. 214—85)

1

Our invention relates to log-loading devices for motor vehicles, and more particularly to log-loading means adapted to be driven by the engine of the vehicle.

A primary object of this invention is to provide a vehicle or truck-mounted, log-loading device, wherein the various parts of the device are arranged in a convenient and highly compact manner, so that the entire bed or platform of the truck may be utilized for supporting the logs.

A further object is to provide a log-loading device of the above-mentioned character, wherein operating levers are arranged to swing horizontally below the truck bed and adjacent to one side of the truck bed.

A further object of the invention is to provide a log-loading device, wherein the logs are rolled up the skids which lead to the bed of the truck.

A further object is to provide a log-loading device which will enable a maximum number of logs to be loaded onto the truck in a safe and efficient manner.

A further object is to provide a novel, adjustable sheave or pulley which is readily removable, so that it may be mounted upon either side of the truck bed, the sheave being freely adjustable longitudinally of the truck bed so that it may be arranged near the longitudinal centers of logs of different lengths.

A still further object of the invention is to provide a log-loading device of the above-mentioned character including a novel winch or drum-operating transmission which is driven from the power take-off shaft of the truck engine and which provides several speeds forward and in reverse for driving the winch or drum in either direction.

Other objects and advantages of the invention will be apparent during the course of the following description.

In the accompanying drawings forming a part of this application, and in which like numerals are employed to designate like parts throughout the same:

Figure 1 is a fragmentary plan view of a motor truck equipped with the log-loading device embodying our invention, parts broken away;

Figure 2 is a fragmentary side elevational view of the truck and device illustrated in Figure 1, parts in section;

Figure 3 is a fragmentary, transverse, vertical sectional view taken on line 3—3 of Figure 1;

Figure 4 is a fragmentary, transverse, vertical sectional view taken on line 4—4 of Figure 2; and Figure 5 is a fragmentary transverse vertical sectional view taken on line 5—5 of Figure 1.

2

In the drawings, where, for the purpose of illustration, is shown a preferred embodiment of the invention, the numeral 10 designates generally the main or chassis frame of a truck, and this main frame 10 comprises the usual elongated, horizontal, transversely spaced rails or beams 11. Mounted in a conventional manner between the beams 11 near their forward ends is the truck engine including a conventional transmission 12 having the usual gearshift lever 13 which is disposed in the cab of the truck, not shown. The usual drive shaft 14 transmits power from the engine transmission 12 to the rear wheels 15 of the truck. The drive shaft 14 is somewhat inclined, as shown, and is disposed slightly below the beams 11 of the main frame, Figure 2. The truck further includes a wide, flat platform or bed 16, which is horizontal and arranged at an elevation somewhat above the main frame 10. The bed 16 is suitably rigidly mounted upon a plurality of transverse beams or joists 17, in turn suitably rigidly secured to the tops of the beams 11. As shown clearly in Figures 1 and 3, the bed 16 and joists 17 extend laterally outwardly of the main frame 10 upon both sides of the same. The opposite longitudinal side edges of the bed 16 are substantially flush with the outer sides of the rear wheels 15, Figure 1. The arrangement is such that a relatively low horizontal space or passage is formed between the tops of the beams 11 and the bed 16.

Rigidly mounted upon one side of the truck engine transmission 12, and projecting laterally outwardly from such side and terminating near and slightly inwardly of the adjacent beam 11, is a power take-off mechanism 18 of the type illustrated in a printed publication of the Ford Motor Company, entitled "1942 Ford Trucks," on page 20. This power take-off mechanism includes the usual stub shaft 19, the operation of which is controlled by a reciprocatory member or plunger 20, both the shaft 19 and plunger 20 being arranged substantially parallel and extending longitudinally of the beams 11. The power take-off stub shaft 19 is spaced laterally of the drive shaft 14, Figure 1, the drive shaft 14 being disposed at the transverse center of the truck.

Rearwardly longitudinally of the transmission 12, and near the longitudinal center of the main frame 10, are a pair of transverse, horizontal, laterally spaced support beams or braces 21 and 22 having their opposite ends suitably rigidly secured to the beams 11. An elongated, longitudinal shaft 23 has its forward end connected with the stub shaft 19 by means of a suitable coupling member 24, and the rear end of the shaft 23 terminates adjacent to the member 21, Figure 1. The shaft 23 is horizontal, and spaced laterally inwardly of the adjacent beam 11, and slightly below the beams or members 21 and 22. The shaft 23 is journaled near its rear end in suitable, self-aligning bearings 25 and 26 rigidly secured to the bottoms of the members 21 and 22, Figure 2. Rigidly mounted upon the rotatable shaft 23 between the members 21 and 22 for rotation therewith is a first relatively small sprocket wheel 27 connected by means of a transversely extending sprocket chain 28 with a second relatively large sprocket wheel 29, in turn rigidly mounted upon a horizontal, longitudinal, rotatable shaft 30, of a gear box or transmission 31.

The shaft 30 is disposed at the transverse center of the truck, and arranged at an elevation slightly above that of the shaft 23, Figure 2. The shaft 30 is journaled near its forward end within a pair of self-aligning bearings 32 and 33 rigidly mounted upon the tops of the beams 21 and 22 at their longitudinal centers. The transmission or gear box 31 has a forward, vertical flange 34 which is bolted or otherwise rigidly secured to an upstanding vertical plate 35, in turn welded or otherwise rigidly secured to the beam 21 and extending transversely between the beams 11, as shown.

As clearly shown in Figure 2, the entire transmission 31, as well as both of the sprocket wheels 27 and 29 and associated elements, are arranged between the beams 11 of the main frame 10 and beneath the platform or bed 16 of the truck.

The horizontal transmission shaft 30 extends longitudinally rearwardly of the transmission or gear box 31, and has mounted thereon for rotation therewith, rearwardly of the gear box, a suitable disc or braking wheel 36 having a relatively large diameter. As shown in Figures 1 and 4, an external brake band including a pair of hingedly connected sections 37 is provided, and the hingedly connected ends of the brake band sections 37 are connected with a horizontal, longitudinally rearwardly extending support arm 38 rigidly secured to the rear end of the gear box or transmission 31. The free ends of the brake band sections 37 are bent to provide radial extensions 39 and 40 which are apertured for receiving a vertically disposed pin or bolt 41 having a top head 42, and carrying a nut 43 at its lower end. A strong, expansible coil spring 44 surrounds the pin 41 between the radial extensions 39 and 40, and this spring serves to bias the extensions apart so that the brake band sections 37 are normally held out of frictional engagement with the braking wheel 36, Figure 4. A substantially horizontal, rearwardly longitudinally extending arm or bracket 45 is rigidly secured to the rear end of the transmission 31 at its side remote from the arm 38, Figure 1. Suitably journaled upon the rear end of the arm or bracket 45 is a transverse, horizontal cam shaft 46 having a pair of eccentric cams 47 rigidly secured thereto for rotation therewith. These cams 47 engage between the head 42 and the uppermost radial extension 39, so that when the cam shaft 46 rotates, the eccentric cams will urge the brake band sections 37 together into frictional engagement with the wheel 36. An upstanding, vertically swingable arm or lever 48 is secured to the cam shaft 46 for rotation therewith between the arm 45 and outermost cam 47, Figure 4, and pivotally connected with the top of this lever 48 is a horizontally swingable, short connecting rod 49 disposed slightly above the top of the transmission 31, Figure 1. As shown in Figure 1, the connecting rod 49 extends diagonally of the main frame 10, and is pivotally connected at its forward end, as at 50, with the innermost end of an elongated, horizontally swingable, transverse brake lever 51 pivotally mounted near and outwardly of its innermost end, as at 52, upon a fixed arcuate locking segment 53, in turn suitably rigidly mounted upon the top of the transmission 31 and at the side of the transmission remote from the arm 38, Figure 1. The brake lever 51 is equipped with the usual hand operated pawl mechanism for locking the lever 51 in the selected adjusted angular positions with respect to the horizontal arcuate sector 53. As shown clearly in the drawings, the brake lever 51 extends transversely outwardly of the main frame 10 upon one side of the same, and is disposed beneath the platform or bed 16, shown dotted in Figure 1, and above the beams 11. The outer end or handle of the brake lever 51 is disposed substantially flush with the adjacent, outer longitudinal edge of the bed 16.

The gear box or transmission 31 is preferably of a conventional type, such as a 1936 model Dodge truck transmission. The gear transmission 31 has two speeds forward and two in reverse, the lower forward and reverse speeds being equal in rate, as are the next higher forward and reverse speeds. This arrangement makes it possible to load and unload logs with the same speed and from either side of the truck, as will be more fully explained hereinafter. The transmission 31 is equipped with a suitable gearshift lever 54, and this lever extends laterally outwardly of the transmission 31 and is arranged horizontally and at a slightly lower elevation than the brake lever 51, so that the two levers may operate without interference. Like the lever 51, the gearshift lever 54 is arranged beneath the bed 16 and above the beams 11, and the gearshift lever 54 has its outer end or handle arranged near the adjacent longitudinal side edge of the bed 16, as shown in Figure 1. The gearshift lever 54, when in the neutral position, Figure 1, extends substantially perpendicular to the beams 11, as shown.

Near and forwardly of the gearshift lever 54, a transverse, horizontal power take-off control lever 55 is pivotally mounted, as at 56, upon the top of the adjacent beam 11. This lever 55 likewise has its outer end disposed adjacent to the longitudinal side edge of the truck bed 16, and the lever 55 is disposed at a slightly different elevation from either of the levers 51 or 54, so that the three levers may be operated without interference from the adjacent side of the truck. The power take-off control lever 55 extends laterally inwardly a short distance from the adjacent beam 11, and over the member 21, Figure 1, and the inner end of the lever 55 is pivotally connected as at 57 with a generally horizontal, diagonally extending link or control rod 58 having its forward end pivotally connected with the reciprocatory plunger 20, as at 59. The arrangement is such that the horizontal swinging of the lever 55 about its pivot 56 will reciprocate the plunger 20 for connecting and disconnecting the power take-off mechanism 18. It is thus seen that the three control levers 51, 54 and 55 of the device are all disposed horizontally and beneath the truck bed 16 adjacent to one side of the truck, so that the driver may stop the truck and apply its emergency brake, allow the truck engine to idle, and be perfectly free to operate the three levers 51, 54 and 55 at one side of the truck during the loading or unloading of the logs. The arrangement is highly simplified and compact and none of the space above the bed 16 and rearwardly of the driver's cab is occupied by any part of the device.

An auxiliary clutch pedal or lever 50' is arranged near and forwardly of the lever 55 and below the adjacent beam 11, and transversely of such beam, Figures 1 and 5. The inner end of this pedal or lever 50' is pivotally connected, as at 51' with the bottom of a depending mounting bracket 52' which is rigidly secured to the bottom of the adjacent beam 11 and projecting laterally inwardly thereof, Figure 5. A retractile coil spring 53' has its top end secured to the beam 11 and its bottom end secured to the pedal or lever 50' laterally outwardly of the adjacent beam 11, and this spring serves to maintain the lever 50' elevated. A horizontal mounting bracket 54' is rigidly secured to the top of the adjacent beam 11, slightly forwardly of the mounting bracket 52', Figure 2, and this mounting bracket 54' has a rotatable guide pulley 55' mounted thereon with its axis of rotation extending transversely of the beam 11. A suitable longitudinally extending break cable 56' is trained over pulley 55' and has one end connected with the pedal or lever 50' below and laterally outwardly of its pivot 51', as shown at 57'. The cable 56' extends longitudinally forwardly adjacent to the beam 11 and is connected with the foot operated clutch pedal in the cab of the truck, not shown. The arrangement is such that when the lever or pedal 50' is depressed or swung downwardly, Figure 5, that the clutch pedal in the cab of the truck is also depressed for releasing the clutch of the truck transmission 12. The auxiliary lever 50' is swung downwardly for releasing the clutch of the truck engine prior to swinging the control lever 55, for rendering the power take-off 18 operative and inoperative.

Near and longitudinally rearwardly of the transmission 31, a transverse bar or support member 60 is arranged horizontally, and has its opposite ends rigidly secured to the beams 11. A similar transverse bar 61 is arranged near the rear end of the main frame 10, and likewise has its opposite ends rigidly secured to the beams 11. Self-aligning bearings 62 and 63 are rigidly mounted upon the bars 60 and 61 and arranged at the transverse center of the truck frame 10. Journaled within these bearings 62 and 63 is a horizontal, longitudinal drum or spool shaft 64 connected at its forward end through a universal joint 65 with the rear end of the shaft 30. As shown in Figure 2, the shaft 30 and 64 may be arranged at the same elevation. Rigidly secured to the shaft 64 for rotation therewith is an elongated, horizontal, longitudinal flanged winding drum 66, upon which is wound a long, sturdy cable 67. As shown in Figure 3, the free end of the cable 67 may be arranged to unwind from the top of the drum 66, and when so unwinding, the cable 67 passes substantially horizontally beneath and close to the bed 16.

We provide a freely longitudinally adjustable sheave or pully 68 freely rotatably mounted, as at 69, upon a horizontal, substantially U-shaped mounting bracket 70, which engages slidably over the adjacent longitudinal side edge of the bed 16, Figure 3. The arrangement is such that the pulley or sheave 68 has its axis of rotation disposed at the elevation of the bed 16, and the bracket 70 is freely slidable longitudinally along the edge of the bed 16 upon which it is mounted. With this arrangement, the pulley or sheave 68 may be adjusted so that the free end of the cable 67 can be arranged substantially at the longitudinal center of the log to be rolled onto the bed 16.

The free end of the cable 67 is equipped with an attaching hook 71 which may be connected with the free end of a strong chain 72, the opposite end of which is suitably securely anchored to the side edge of the bed 16 adjacent to the sheave 68. As shown in Figure 3, the chain 72 extends transversely of the bed 16, and across the entire width of the bed.

The usual inclined skids 73 are provided, and the upper ends of these skids are equipped with hooked extensions or bars 74 which engage over the adjacent side edge of the bed 16. It should be noted that the tops of the skids 73 are arranged substantially flush with the top of the bed 16, so that the large log L which is rolled up the skids will not drop upon the truck bed 16, which would be likely to cause damage.

The operation of our machine is as follows:

The driver may stop the truck at the desired location and apply the emergency brakes of the truck so that it will remain stationary during the loading or unloading of the logs. The truck engine is allowed to idle, and the truck gearshift lever 13 is placed in neutral. Whenever the power takeoff lever 55 is swung to the left, Figure 1, the plunger 20 will be shifted axially inwardly for connecting the power take-off shaft 19 with the truck transmission 12. When this occurs, the shafts 23 and 30 will rotate. When the lever 55 is swung to the right or to its position shown in Figure 1, the power takeoff shaft 19 will be disconnected from the truck transmission and stationary. During this time, the driver manipulates the lever 54 of the transmission 31 to select the speed, either forward or reverse, at which he wishes to load or unload the log 12. When the gearshift lever 54 has been arranged in the selected adjusted position, and the brake lever 51 has been swung to the right or to its position shown in Figure 1, wherein the brake band sections 37 are free from engagement with the wheel 36, the lever 55 is swung to the left, Figure 1, for imparting rotation to the shafts 23 and 30, as previously explained. This will cause the drum shaft 64 to rotate in the desired direction for winding or unwinding the cable 67.

It should be understood that prior to swinging the power take-off lever 55 in either direction, while the truck engine is idling, the auxiliary clutch lever or pedal 50' should be depressed or swung downwardly for depressing the clutch pedal in the cab of the truck. This renders it possible to connect and disconnect the power take-off 18 without the clashing of gears. The auxiliary lever or pedal 50' is arranged near the lever 55, so that both may be manipulated simultaneously by the operator standing at the adjacent side of the truck.

Whenever it is desired to halt the movement of the log L during its loading or unloading, the power take-off control lever should be swung to the right or to its position illustrated in Figure 1 for stopping the rotation of the shafts 23 and 30. When this has been done, the brake lever 51 may be swung to the left, Figure 1, and this will shift the brake band sections 37 into tight, clamping engagement with the braking wheel 36. When this occurs, the drum 66 and its shaft will be positively held against rotation, and the strain due to the weight of the log L will be taken off of the gear within the transmission 31. The brake lever 51 provides a safety feature, whereby the rotation of the winding drum 66 may be stopped quickly at any desired point. As previously stated, the three control levers 51, 54 and 55 may be conveniently operated by the driver while he is standing substantially in one position adjacent to one side of the truck.

As shown clearly in Figure 3, the logs L are actually rolled up the skid 73 and onto the bed 16. The chain 72 is passed beneath the logs and extends transversely entirely across the truck bed. As the cable 67 is wound upon the drum 66, the top or free end of the chain 72 will be drawn over the truck bed by the hook 61. The first log L may thus be rolled entirely across the bed 16 until it is arranged near the side of the bed upon which the sheave 68 is mounted. The chain may then be disconnected from the hook 71 and passed about the next log to be rolled onto the truck bed. Such next log is rolled up the skids 73 in exactly the same manner and across the truck bed 16 until it engages the first log. In this manner, the entire width of the bed 16 may be used to accommodate additional logs, and still other logs may be loaded upon those which rest upon the bed 16. In this manner, as many as 15 or 16 large logs may be loaded at one time upon the bed.

It is obvious that the mounting bracket 70 and sheave 68 may be bodily removed and mounted upon the opposite longitudinal edge of the truck bed 16, so that logs may be loaded and unloaded onto and from the opposite side of the truck. When this is done, the cable 67 is wound up in the opposite direction upon the drum 66, so that the free end of the cable will be payed out from the bottom side of the drum and unwound toward the opposite side of the truck. The cable 67 is long enough so that logs may be dragged from unaccessible areas to be loaded upon the truck.

It is to be understood that the form of our invention herewith shown and described is to be taken as a preferred example of the same, and that various changes in shape, size and arrangement of parts may be resorted to without departing from the spirit of the invention or the scope of the subjoined claims.

Having thus described our invention, we claim:

1. A log-loading device for a truck having a horizontal main frame and a horizontal bed spaced above the main frame and an engine including a power take-off mechanism, said device comprising a gear transmission disposed near the longitudinal center of the truck main frame and mounted upon the main frame and arranged below the bed, gearing connecting the gear transmission with the power take-off mechanism of the engine, a horizontally swingable lever pivotally mounted upon the truck and arranged beneath the bed of the truck, a control rod connected with the lever and with the power take-off mechanism for rendering such mechanism operative and inoperative, said gear transmission including a horizontal transverse gearshift lever arranged near said horizontally swingable lever and beneath the bed of the truck, a horizontal longitudinally extending winding drum rotatably mounted upon the main frame rearwardly of the gear transmission and connected with the gear transmission to be driven thereby, a brake device secured to the gear transmission and connected with the winding drum for controlling the rotation of the drum, and a horizontal transverse brake lever mounted upon the gear transmission and connected with the brake device for actuating the same, the brake lever being arranged near said gearshift and horizontally swingable levers, all of said levers projecting laterally upon one side of the truck and beneath the truck bed, a cable wound upon the winding drum so that it may be payed out transversely of the bed, and a longitudinally disposed sheave slidably mounted upon one longitudinal side edge of the bed and adapted to have the free end of the cable passed thereabout.

2. A log-loading device for a truck having a substantially horizontal main frame, a bed spaced above the main frame and an engine including a power take-off mechanism, the device comprising a horizontally swingable power take-off control lever pivotally secured to the main frame and projecting laterally beyond one side of the main frame and having its outer end disposed near one side edge of the bed, the control lever being disposed beneath the bed, means connecting the inner end of the control lever and power take-off mechanism for rendering the mechanism operative and inoperative when the control lever is swung in opposite directions, a gear transmission mounted upon the main frame and spaced longitudinally rearwardly of the engine and including a horizontally swingable gearshift lever arranged beneath the bed and extending laterally beyond that side of the main frame adjacent to the control lever and having its outer end terminating near the adjacent longitudinal side edge of the bed, gearing permanently connecting the transmission and power take-off mechanism so that when such mechanism is operating the transmission will be operated, a friction brake mounted upon the transmission for controlling its operation, a horizontally swingable brake lever pivotally mounted upon the transmission and connected with the brake for actuating it, the brake lever extending transversely beyond that side of the main frame adjacent to the control and gearshift levers, the brake lever being disposed beneath the bed and having its outer end arranged near the adjacent longitudinal side edge of the bed, a winding drum journaled upon the main frame longitudinally rearwardly of the transmission and connected with the transmission to be driven thereby, a cable wound upon the drum so that it may be payed out transversely of the main frame and bed, the drum being arranged beneath the bed, and a longitudinally adjustable sheave slidably mounted upon one longitudinal side edge of the bed and adapted to have the free end of the cable passed thereabout.

MILES M. McBRIDE.
LEONARD L. McBRIDE.
SAMUEL D. CURRY.

REFERENCES CITED

The following references are of record in the file of this patent:

UNITED STATES PATENTS

| Number | Name | Date |
| --- | --- | --- |
| 1,339,290 | Schaefer | May 4, 1920 |
| 1,346,152 | Amos et al. | July 13, 1920 |
| 1,447,201 | Brown et al. | Mar. 6, 1923 |
| 1,457,947 | Stanbrough | June 5, 1923 |
| 2,073,563 | Phillips | Mar. 9, 1937 |